(12) United States Patent
Davis et al.

(10) Patent No.: US 12,447,051 B2
(45) Date of Patent: Oct. 21, 2025

(54) MULTI-FUNCTIONAL ANALGESIC-RELEASING WOUND DRESSING

(71) Applicant: University of Utah Research Foundation, Salt Lake City, UT (US)

(72) Inventors: Brett H. Davis, Salt Lake City, UT (US); Jayant P. Agarwal, Salt Lake City, UT (US); Caleb A. Lade, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 909 days.

(21) Appl. No.: 17/409,211

(22) Filed: Aug. 23, 2021

(65) Prior Publication Data

US 2021/0378870 A1    Dec. 9, 2021

Related U.S. Application Data

(60) Provisional application No. 63/069,466, filed on Aug. 24, 2020.

(51) Int. Cl.
   *A61F 13/00*   (2024.01)
   *A61K 9/70*    (2006.01)
   (Continued)

(52) U.S. Cl.
   CPC ...... *A61F 13/00063* (2013.01); *A61K 9/7007* (2013.01); *A61K 31/167* (2013.01);
   (Continued)

(58) Field of Classification Search
   None
   See application file for complete search history.

(56) References Cited

U.S. PATENT DOCUMENTS 5,522,794 A *  6/1996  Ewall ............... A61F 13/023
                                                    602/56
5,919,473 A    7/1999  Elkhoury
                (Continued)

FOREIGN PATENT DOCUMENTS

| AU | 1813402 A |   | 4/2002 |   |
|----|-----------|---|--------|---|
| CN | 1628151 A | * | 6/2005 | ............. C08G 69/40 |

(Continued)

OTHER PUBLICATIONS

CN-1628151-A translation (Year: 2005).*
(Continued)

*Primary Examiner* — Kim M Lewis
(74) *Attorney, Agent, or Firm* — Workman Nydegger

(57) ABSTRACT

A wound dressing including a porous biosynthetic polymer film comprising a poly(lactide-co-caprolactone) ("PLC") copolymer or other suitable polymer matrix, and a local analgesic loaded therein, to provide pain relief over an extended period of time (e.g., for 5-7 days), e.g., for healing of a partial thickness dermal injury. The PLC copolymer may have a particular lactide/caprolactone molar ratio (e.g., from 2:1 to 9:1) to ensure slow, sustained release of the bupivacaine or other analgesic. The dressing may provide a water vapor transmission rate from 1000 $g/m^2 \cdot day$ to 3000 $g/m^2 \cdot day$ to facilitate fast healing and regrowth of new epithelial tissue beneath the dressing. The dressing is configured to remain positioned over the dermal injury, providing wound protection for about 14 days, after which is simply debrides away, falls off, or is easily and painlessly removed, once new epithelial tissue regrows.

19 Claims, 2 Drawing Sheets

(51) Int. Cl.
*A61K 31/167* (2006.01)
*A61K 31/445* (2006.01)
*A61K 47/34* (2017.01)

(52) U.S. Cl.
CPC ............ *A61K 31/445* (2013.01); *A61K 47/34* (2013.01); *A61F 2013/00906* (2013.01)

(56) References Cited

U.S. PATENT DOCUMENTS

| | | | |
|---|---|---|---|
| 6,124,273 | A | 9/2000 | Drohan et al. |
| 7,625,581 | B2 | 12/2009 | Laredo et al. |
| 7,709,018 | B2 | 5/2010 | Pastorello et al. |
| 8,409,610 | B2 | 4/2013 | Friis et al. |
| 9,848,955 | B2 | 12/2017 | Buevich et al. |
| 2004/0002675 | A1 | 1/2004 | Nierle et al. |
| 2004/0161453 | A1* | 8/2004 | Serafica ............... A61L 15/40 424/445 |
| 2012/0064146 | A1 | 3/2012 | Friis et al. |
| 2012/0136323 | A1 | 5/2012 | Stasko et al. |
| 2015/0182512 | A1* | 7/2015 | King ............... A61K 31/445 514/330 |
| 2018/0289560 | A1* | 10/2018 | Caneppele ............ A61F 13/024 |

FOREIGN PATENT DOCUMENTS

| | | |
|---|---|---|
| EP | 1898881 A2 | 3/2008 |
| EP | 2322232 B1 | 9/2017 |
| IN | 323/ | 11/2015 |
| WO | WO-0139756 A1 * | 6/2001 ............ A61K 9/703 |
| WO | 2002/030480 A1 | 4/2002 |
| WO | 2006/130455 A2 | 12/2006 |
| WO | 2012/122956 A1 | 9/2012 |

OTHER PUBLICATIONS

International Search Report and Written Opinion received for PCT Patent Application No. PCT/US21/47400, mailed on Feb. 7, 2022, 14 pages.
International Search Report and Written Opinion received for PCT Patent Application No. PCT/US21/47400, mailed on Nov. 9, 2021, 2 pages.
Aduba Jr. et al., "Polysaccharide fabrication platforms and biocompatibility assessment as candidate wound dressing materials", Bioengineering, 2017, vol. 4, pp. 16.
Chen et al., "Recent advances in electrospun nanofibers for wound healing", Nanomedicine, vol. 12, Issue 11, May 18, 2017, pp. 1335-1352.
Kamble et al., "Nanofiber based drug delivery systems for skin: A promising therapeutic approach", Journal of Drug Delivery Science and Technology, vol. 41, Oct. 2017, pp. 124-133.
Yadav et al., "An insight on hyaluronic acid in drug targeting and drug delivery", Journal of Drug Targeting, vol. 16, Issue 2, 2008, pp. 91-107.

* cited by examiner

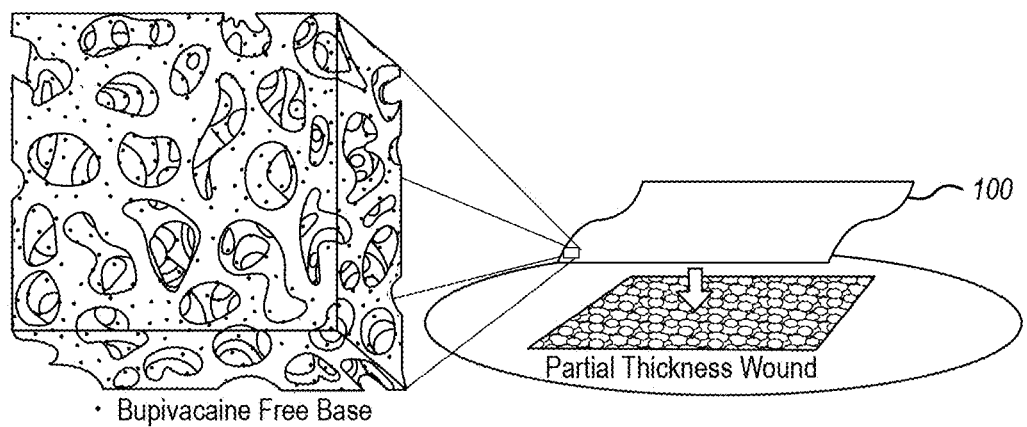
FIG. 1
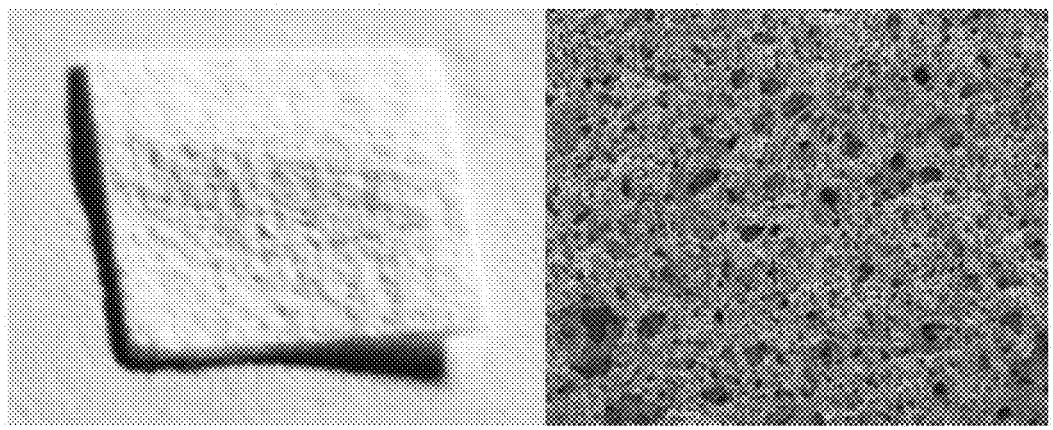
FIG. 2A  FIG. 2B

MULTI-FUNCTIONAL ANALGESIC-RELEASING WOUND DRESSING

CROSS-REFERENCE TO RELATED APPLICATIONS

This application claims the benefit under 35 U.S.C. 119(e) of U.S. Provisional Patent Application Ser. No. 63/069,466, filed Aug. 24, 2020 and titled "MULTI-FUNCTIONAL ANALGESIC-RELEASING WOUND DRESSING", which is herein incorporated by reference in its entirety.

STATEMENT REGARDING FEDERALLY SPONSORED RESEARCH OR DEVELOPMENT

This invention was made with government support under grant no. 1946204 awarded by the National Science Foundation. The government has certain rights in the invention.

BACKGROUND

1. The Field of the Invention

The present invention is in the field of wound dressings, e.g., biosynthetic wound dressings that would function as temporary epidermal replacements to allow new epidermal growth underneath, while providing therapeutic analgesic release over an extended period of time during healing.

2. The Relevant Technology

While wound dressings are available for use in split-thickness skin grafting donor sites, second degree burns, and other partial thickness epithelial tissue injuries, pain remains a major complaint of patients healing from such injuries. Pain associated with such injuries and their healing is often severe, and is most typically treated with prescription opiates, which while offering strong pain relief, are highly addictive, in addition to exhibiting other drawbacks.

As such, there continues to be a need for alternative products that could provide for pain relief over a sustained period of time while such wounds heal, without having to resort to opiates for pain relief.

The subject matter claimed herein is not limited to embodiments that solve any particular disadvantages or that operate only in environments such as those described above. Rather, this background is only provided to illustrate one exemplary technology area where some embodiments described herein may be practiced.

BRIEF SUMMARY

The present disclosure is directed to an analgesic-releasing wound dressing that includes a porous biosynthetic polymer film, and a local analgesic impregnated within the porous biosynthetic polymer film. The wound dressing can be particularly configured to provide sustained release of the local analgesic (e.g., bupivacaine or another amide-based analgesic) over an extended period of time, e.g., at least 1 day, at least 2 days, at least 3 days, at least 4 days, such as from 3 to 7 days, from 4 to 7 days, or from 5 to 7 days. In an embodiment, the wound dressing may be formed of a durable polymeric material that is not dissolvable or resorbable within the contemplated healing time (e.g., about 14 days), but may fall off or be debrided from the wound site naturally, once underlying epithelial tissue has a chance to regrow, during the healing period.

The length of time that the dressing is configured to release the analgesic may be configured to depend on the type of use that the particular dressing is to be used for. For example, the dressing can be used to facilitate healing and control pain for various skin injuries, whether partial thickness skin injuries or conditions, including, but not limited to partial thickness skin grafts, other partial thickness epithelial injuries, for use during healing after application of a tattoo, etc. Partial thickness injuries refer to injuries that affect the epidermis, and a part of the dermis layer, as will be appreciated by those of skill in the art. The duration of the pain relief offered with the dressing may depend on the particular use contemplated.

In an embodiment, the porous biosynthetic polymer film comprises a biocompatible polymer such as polylactic acid (PLA), polycaprolactone (PCL), polyglycolic acid (PGA), or any of various other polymers exhibiting good biocompatibility, including combinations or copolymers thereof. By way of further example, the porous polymer film may be a poly(lactide-co-caprolactone) (PLC) copolymer, polylactic acid (PLA), poly(lactide-co-glycolide) copolymer (PLGA) or polycaprolactone (PCL). As noted, various other porous biosynthetic polymer films may also be suitable for use.

In an embodiment, the local analgesic comprises a small molecule analgesic that is hydrophobic (e.g., having a molecular weight that is less than 500, less than 400, or less than 300 Daltons).

In an embodiment, the hydrophobic local analgesic has a partition coefficient (log P) value of at least 2.0, at least 2.5, at least 3.0, less than 5.0 or less than 4.0 (e.g., from 3.0 to 3.8).

In an embodiment, the local analgesic comprises an amide-type local analgesic (e.g., one or more of bupivacaine, levobupivacaine, lidocaine, prilocaine, or ropivacaine).

In an embodiment, the wound dressing provides sustained release of the local analgesic over a period of at least 2 days, over a period of from 1 to 3 days, 3 to 5 days, 3 to 7 days, or 4 to 7 days.

In an embodiment, the porous biosynthetic polymer film is a PLC polymer, and has a lactide/caprolactone molar ratio from 2:1 to 10:1.

In an embodiment, the porous biosynthetic polymer film has a water vapor transmission rate from 1000 $g/m^2 \cdot day$ to 3000 $g/m^2 \cdot day$.

In an embodiment, the local analgesic is loaded into the porous biosynthetic polymer film in an amount from 5% to 20%, or from 10% to 15% by weight.

In an embodiment, the wound dressing is configured as a single layer that is substantially homogenous throughout a thickness thereof.

In an embodiment, the wound dressing has a thickness of at least 200 μm (e.g., up to 2 mm, or up to 1 mm thick).

In an embodiment, the porous biosynthetic polymer film further comprises hyaluronic acid. Where such is included, the biopolymer (e.g., such as PLC) may comprise from 5-95% by weight of the polymer film, while the hyaluronic acid may comprise at least 1%, at least 2%, at least 3%, at least 4%, or at least 5%, such as from 1% to 95% by weight of the polymer film. By way of example, either the hyaluronic acid or the biopolymer may comprise 5%, 10%, 15%, 20%, 25%, 30%, 35%, 40%, 45%, 50%, 55%, 60%, 65%, 70%, 75%, 80%, 85%, 90%, or 95% by cumulative weight of the biopolymer and the hyaluronic acid. Such values may be exclusive of the local analgesic, or other components that may be present within the wound dressing.

In an embodiment, an antimicrobial agent is incorporated into the wound dressing (e.g., into the porous biosynthetic polymer film).

Another embodiment is directed to an analgesic-releasing single-layer wound dressing comprising a porous biosynthetic polymer film comprising a poly(lactide-co-caprolactone) copolymer, having a lactide/caprolactone molar ratio from 2:1 to 9:1, and having a water vapor transmission rate from 1000 g/m$^2$·day to 3000 g/m$^2$·day, wherein the biosynthetic polymer film is resorbable or dissolvable when positioned for use over a partial thickness dermal injury of a patient, so as to remain in place, providing wound protection for at least 10 days, but debriding, falling off, or otherwise being removed within 20 days when positioned over a partial thickness dermal injury of a patient. The wound dressing further includes a local analgesic comprising an amide-type analgesic having a partition coefficient (log P) value from 3.0 to 3.8, the analgesic being impregnated within the porous biosynthetic polymer film at a weight fraction of from 5-20% relative to the porous biosynthetic polymer film, wherein the wound dressing provides sustained release of the analgesic over a period of at least 1 day.

One such embodiment may provide sustained release of the local analgesic over a period of about 7 days, while the biosynthetic polymer film debrides away, falls off, or is otherwise removed after about 14 days.

Another embodiment is directed to a method of treating pain associated with an injury, such as dermal injury, more specifically such as a partial thickness dermal injury. Such a method may include providing a wound dressing such as any of those disclosed herein. For example, the wound dressing may include a porous biosynthetic polymer film comprising a poly(lactide-co-caprolactone) copolymer and a local analgesic impregnated within the porous biosynthetic polymer film. The wound dressing may provide sustained release of the local analgesic over a period of at least 1 day. The method includes placing (e.g., adhering) and using the wound dressing over the dermal injury to promote healing thereof, while reducing pain over a sustained period of time of at least 1 day.

In an embodiment, the method provides sustained release of the local analgesic over a period of from 1 to 3 days, 3 to 5 days, 3 to 7 days, or 4 to 7 days.

In an embodiment, the local analgesic comprises an amide-type local analgesic (e.g., one or more of bupivacaine, levobupivacaine lidocaine, prilocaine, or ropivacaine).

In an embodiment the wound dressing remains in place over the dermal injury for a full duration of healing thereof, without removal of the wound dressing for any wound dressing changes. For example, a full duration of healing may be about 14 days.

In an embodiment, the wound dressing releases a burst of the local analgesic over days 1-3 after application over the partial thickness dermal injury, followed by a sustained tapered release from days 4-7 after application.

In an embodiment, the burst of released local analgesic accounts for at least 60% of the total local analgesic released, while a remainder (e.g., up to 40%) of the local analgesic is released during the sustained tapered release period. For example, in an embodiment, at least 60% of the local analgesic may be released over days 1-3, while up to 40% of the local analgesic may be released over days 4-7.

Another embodiment is directed to a method for manufacturing an analgesic-releasing single-layer wound dressing. Such a method may include preparing a dispersion within a carrier for use in forming the wound dressing, the dispersion comprising the carrier and, e.g., a poly(lactide-co-caprolactone) copolymer or precursor thereof (e.g., PLA and PCL) for forming a porous biosynthetic polymer film. The dispersion can also include a local analgesic (e.g., bupivacaine or another amide-based analgesic) and a salt present in sufficient amount to result in a desired porosity to the biosynthetic polymer film (e.g., from 70-90%) after leaching. Such porosity may be measured on a volumetric basis (e.g., 70-90% of the volume of the polymer wound dressing may be pores). The method may further include casting the dispersion to create a biosynthetic polymer film including a matrix of the poly(latide-co-caprolactone) or other polymer loaded with the local analgesic and the salt. The salt is then leached from the cast dispersion to result in the desired porous biosynthetic polymer film, loaded with the local analgesic. In an example, the local analgesic is present at a weight fraction of from 5-20% relative to the porous biosynthetic polymer film. The molar ratio of lactide/caprolactone in the matrix can be, for example, from 2:1 to 9:1.

In an embodiment, the salt may be a basic salt (e.g., sodium citrate). The salt may provide a pH of greater than 7 (e.g. 7.5 to 9).

In an embodiment, the method may further include heat annealing the polymer film at a temperature of at least 70° C., such as from 70 to 90° C. (e.g., 75 to 85° C.). Such annealing temperature may be maintained for a period of at least 1 hour, e.g., 1-16 hours, such as 2 hours, 4 hours, 8 hours, or 16 hours.

In an embodiment, leaching the salt can be achieved by immersing the cast dispersion in water for a period of up to 24 hours (e.g., 1 hour, 2 hours, 4 hours, 8 hours, etc.).

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

Additional features and advantages of the disclosure will be set forth in the description which follows, and in part will be obvious from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof, which are illustrated in the appended drawings. It is appreciated that these drawings depict only typical embodiments of the disclosure and are not therefore to be considered to be limiting of its scope.

FIG. 1 schematically illustrates an exemplary wound dressing configured to release analgesic over a sustained period of time.

FIGS. 2A and 2B show a photograph, and an SEM image, respectively, of the surfaces of bupivacaine-loaded microporous films as described herein.

DETAILED DESCRIPTION

I. Introduction

Figure 3:
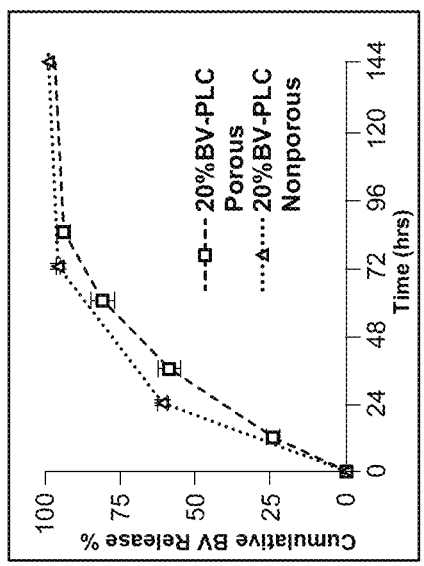
FIG. 3 shows cumulative bupivacaine release as a function of time, for different biosynthetic polymer films having different porosity values.

The present disclosure is directed to an analgesic-releasing wound dressing 100 as shown in FIG. 1 that includes a porous biosynthetic polymer film, and a local analgesic impregnated within the porous biosynthetic polymer film. The wound dressing can be particularly configured to provide sustained release of the local analgesic (e.g., bupivacaine) over an extended period of time, e.g., at least 1 day, at least 2 days, at least 3 days, at least 4 days, such as from 3 to 7 days, from 4 to 7 days, or from 5 to 7 days. In an embodiment, the wound dressing may be formed of a durable polymeric material that is not dissolvable or resorbable within the contemplated healing time (e.g., about 14 days), but may fall off or be debrided from the wound site naturally, once underlying epithelial tissue has a chance to regrow, during the healing period. Advantageously, the polymeric material may not degrade in a manner that would produce significant acidic compounds (e.g., PLA, PGA, etc.) that might irritate the tissue undergoing healing within such period. Thus the polymer wound dressing may not dissolve or resorb into the tissue, but rather remains generally intact during the healing period, and is debrided or worn away, or removed (without pain) once the healing period has passed. To allow such removal, any adhesion between the wound dressing and underlying tissue may be sufficiently low to allow bond separation between the newly grown skin tissue and the wound dressing, rather than pulling newly grown skin tissue off with the dressing (which would be painful and counter-productive).

The length of time that the dressing is configured to release the analgesic may be configured, depending on the type of use for which the particular dressing is to be used. For example, the dressing can be used to facilitate healing and to control pain for various skin injuries, including partial thickness skin injuries or conditions, including, but not limited to partial thickness skin grafts, other partial thickness epithelial injuries, for use after application of a tattoo, etc. The duration of the pain relief offered with the dressing may depend on the particular use contemplated. In an embodiment, it may be important that the wound dressing be configured to ensure that delivery of the analgesic does not interfere with, or slow down healing of the wound site, e.g., as compared to the rate or speed at which healing would occur, without the analgesic.

II. Exemplary Systems and Methods

In an embodiment, the biosynthetic polymer film may comprise any biocompatible polymer such as polylactic acid (PLA), polycaprolactone (PCL), polyglycolic acid (PGA), or any of various other polymers exhibiting good biocompatibility, including combinations or copolymers thereof. In one example, the polymer film may be formed from a copolymer of lactide and caprolactone monomers (e.g., a poly(lactide-co-caprolactone) "PLC" copolymer. Such a polymer provides good durability for the contemplated healing period (e.g., about 14 days), and is stable, such that it will not significantly degrade (which would generate acidic components that might irritate the wound site and surrounding tissues) within such time period, but will remain substantially stable and intact, protecting the underlying wound site while healing occurs. While the polymer matrix material may be stable under such conditions and for the contemplated healing period, it is also configured to be worn or debrided away, or otherwise fall or peel off, once the underlying new epithelial tissue has a chance to regrow (e.g., after about 14 days).

It will be appreciated that while PLC is an example of a particularly suitable polymeric material for use in the matrix, other polymer materials may also be suitable for use as the polymer matrix within which the analgesic is loaded. For example, where other materials may provide similar properties, such materials may also be suitable for use. Examples of other potentially suitable polymer matrix materials include, but are not limited to various biocompatible polyesters, including copolymers of one or more of PLA, PLGA, PCL, and the like. By way of example, SUPRATHEL uses a poly(lactide-co-caprolactone-co-carbonate) polymer matrix. Various other potentially suitable polymer matrix materials will be apparent to those of skill in the art, in light of the present disclosure.

In an embodiment, the polymer may comprise a relatively thin film (e.g., no more than 2 mm, or no more than 1 mm thick, at least 200 µm thick). In addition to providing sufficient strength and durability to protect the underlying wound site, the polymer may also be particularly configured to provide a water vapor transmission rate (WVTR) that facilitates fast and proper wound healing (e.g., a WVTR of from 1000 to 3000 $g/m^2 \cdot day$, such as from 1750 to 2300 $g/m^2 \cdot day$).

In an embodiment, a lactide/caprolactone molar ratio of the PLC copolymer may range from 1.5:1 to 10:1, from 2:1 to 10:1, from 2.2:1 to 10:1, or from 2.2:1 to 9:1. In other words, the PLC copolymer may have significantly more lactide than caprolactone, such as 70% to 90%, or about 80-85% lactide (with 10-30%, or 15-20% caprolactone). In an embodiment, the copolymer may be a binary copolymer. The copolymer may be of various configurations, such as a random or a block copolymer. The polymer chain length may also be adjusted to provide the desired properties of drug elution activity, WVTR, etc.

In an embodiment the local analgesic comprises a relatively small molecule (e.g., having a molecular weight of less than 500, less than 400, or less than 300 Daltons) that is hydrophobic. As to hydrophobicity, the partition coefficient (log P) for the selected analgesic may be at least 2.0, at least 2.5, at least 3.0, but less than 4.0 (e.g., 3.0 to 3.8). Bupivacaine is a particularly suitable example of an analgesic, although it will be appreciated that other amide-type local analgesic/anesthetic components, or even perhaps other analgesic/anesthetic components may be employed. For example, other amide-type "-caine" components could alternatively or additionally be used (e.g., levobupivacaine, lidocaine, prilocaine, ropivacaine etc.). It will be appreciated that a suitable analgesic will be capable of slow, sustained elution from the polymer matrix over a period of several days, with minimal or no risk of toxicity during the healing period, to provide prolonged, sustained pain relief. Although analgesic and anesthetic may have distinct meanings in some fields as appreciated by those of skill in the art, they may generally be used interchangeably herein.

The analgesic can be loaded into the porous biosynthetic polymer film in any desired range, e.g., from 1-50%, or 1-40%, although more typically the amount may be from 5-20%, or from 10-15% by weight relative to the combined weight of the analgesic and the (co)polymer matrix film. The above percentages may equally refer to the weight fraction of the analgesic relative to the wound dressing as a whole, particularly where the wound dressing may consist essentially of the polymer matrix and the analgesic (e.g., minimal other components such as unleached residual salt, etc. may be present). Advantageously, the wound dressing may be configured and prepared as a single substantially homogenous layer, e.g., without any more complex construction (e.g., no reinforcing differently configured laminate or composite layers). Such a single layer construction is relatively simple and inexpensive to manufacture by comparison to more complex possible structures.

While in an embodiment, the wound dressing may include hyaluronic acid, such is not necessary, and in at least one embodiment, no such component is added. If hyaluronic acid is included, the hyaluronic acid may comprise at least 1%, at least 2%, at least 3%, at least 4%, or at least 5%, such as from 1% to 95% by weight of the polymer film. By way of example, either the hyaluronic acid or the biopolymer may comprise 5%, 10%, 15%, 20%, 25%, 30%, 35%, 40%, 45%, 50%, 55%, 60%, 65%, 70%, 75%, 80%, 85%, 90%, or 95% by cumulative weight of the biopolymer and the hyaluronic acid. Such values may be exclusive of the local analgesic, or other components (e.g., antimicrobial agent) that may optionally be present within the wound dressing.

It will be appreciated that other active agents may be added to the wound dressing, as desired, e.g., such as an antimicrobial agent. That said, in at least one embodiment, no such antimicrobial agent is intentionally added. Minimization of wound infection or ingress of microbes may be provided by the polymer film itself, which covers and protects the site, particularly where the wound dressing is intended and configured to be placed, and to remain in place for the duration of healing, without any required wound dressing changes. Of course an antimicrobial cream, gel, or other composition could be used in conjunction with the wound dressing (e.g., over the dressing), if desired. Dressing changes as described above are actually one of the major drawbacks (and sources of severe pain) associated with existing state of the art wound dressing products, as many such existing wound dressings require changing of the dressing directly over the wound site before healing has completed. Such dressing changes can be extremely painful, often requiring the involvement of an anesthesiologist, prescription of additional opioids, etc.

In an embodiment according to the present disclosure, the wound dressing is positioned over the partial-thickness dermal injury and allowed to remain in place (no wound dressing changes), until the new epithelial growth underlying the dressing has grown into place, at which time any remaining portions of the wound dressing that may not have already fallen off or debrided away may simply be removed (e.g., peeled off), with no significant pain associated with such removal. For example, the dressing may provide wound site protection for at least 10 days (e.g., 10-20 days, such as about 14 days), after which the dressing may automatically fall off, debride away, or any remaining portions thereof may be removed (e.g., after about 14 days) with little if any pain. Where desired, secondary dressings may be employed over the presently disclosed wound dressing. Removal and change of such secondary wound dressings is of course possible, and would not be the source of any significant pain, as such secondary dressings would not strongly adhere to the present inventive wound dressing, and could be easily removed, without disturbing the wound site.

Figure 5:
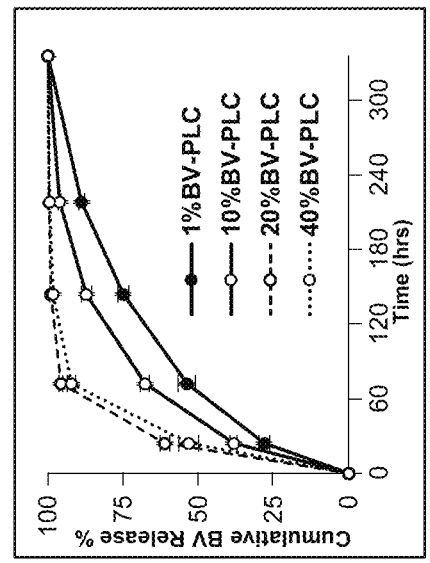
FIG. 5 shows cumulative bupivacaine release as a function of time, for different porous biosynthetic polymer films loaded with bupivacaine in different amounts.
Figure 6:
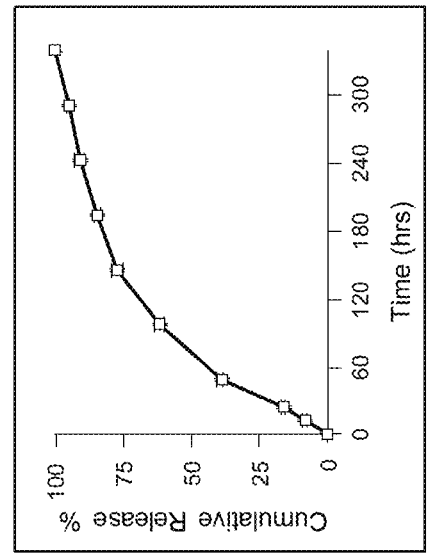
FIG. 6 shows cumulative bupivacaine release as a function of time, showing characteristics of one sustained release profile, where an initial burst is provided over days 1-3 or days 1-5, with a tapered, but still sustained release over the following days, up to 12.5 days (i.e., 300 hours).

The presently disclosed wound dressing, including the polymer selection, molar ratio of copolymer components, porosity thereof, analgesic loading and other characteristics may be tailored to provide a "boosted" or "burst" release of the analgesic over the first ~72 hours or ~120 hours of use, followed by a tapered reduced, but still sustained release of the analgesic over the next few days (e.g., from days 4-7, or otherwise). FIG. 6 illustrates an exemplary release profile exhibiting such characteristics, e.g., where a majority (e.g., 60-75%) of the analgesic is released within the first 3 days or 5 days, followed by a slower elution release rate of the remaining analgesic over the next few days (e.g., days 4-7, or up to day 12). For example, the initial burst of released local analgesic may account for at least 60% of the local analgesic released, while a remainder (e.g., up to 40%) of the local analgesic is released during the sustained tapered release. Such a release profile can be advantageous, as the pain associated with many such partial thickness epithelial tissue injuries is most severe during the first 48-72 hours, after which some pain may still be reported, but such later stage pain is typically reduced. The release profile may thus automatically be tailored to provide a higher dose of the analgesic when pain is at its most severe. Such a release profile can be automatically achieved through appropriate selection of the various characteristics of the wound dressing, such as porosity, monomer selection, ratio of monomers in a copolymer film, analgesic loading, etc., as evidenced by FIGS. 3-5.

The wound dressing may be manufactured by methods that will be apparent to those of skill in the art, e.g., using a casting technique. Other techniques may also be suitable for use. In an embodiment, a dispersion or solution may be prepared, e.g., including a carrier in which the polymer component(s) or precursor(s) thereof (e.g., PLA and PCL in the case of a poly(lactide-co-caprolactone) copolymer) are provided, with the local analgesic, and with a salt used to achieve a desired porosity to the finished polymer matrix. In an embodiment, the salt may be provided with particle size characteristics to ensure the desired drug elution and/or WVTR characteristics. By way of example, porosity may be from 70-90%. While a nonporous polymer matrix can still elute the loaded bupivacaine (see FIG. 3), the porosity may be particularly important to achieving needed WVTR characteristics, which are important to ensuring rapid and proper healing. Porosity can also affect the release profile of the analgesic, aiding in providing the desired "burst" during the initial days after placement, followed by a lower sustained release in subsequent days.

The dispersion can be cast to form an intermediate cast structure that includes the salt particles within the casting, which can then be leached out (e.g., using any suitable solvent to dissolve the salt, such as water), leaving behind the desired porous polymer matrix loaded with the analgesic. While some of the analgesic may leach out during removal of the salt, this can be minimized or reduced by using a salt having a basic pH, within which solution during leaching the solubility of the analgesic is reduced. For example, while NaCl is a suitable salt for achieving porosity, use of a basic salt such as sodium citrate (or any other suitable salt of a strong base and weak acid) may reduce the amount of analgesic that leaches out with the salt, during formation of the porous structure. By way of example, the leaching solution may have a pH greater than 7, where a basic salt is employed, e.g., a pH of from 7.5 to 9 may be particularly suitable. Such elevated pH may reduce the solubility of the analgesic in the leaching solution. Leaching may include immersing the cast dispersion in water for a period of up to 24 hours, such as 1 hour, 2 hours, 4 hours, 8 hours, 16 hours, etc. In another embodiment, it may be possible to load the porous polymer matrix with the analgesic after formation of the pores.

Once formed, the polymer matrix may be annealed to slow or otherwise alter the release rate of the analgesic from the wound dressing. For example, the polymer film can be heat annealed (e.g., at a temperature of from 70-90° C., or from 75-85° C.) for a given period of time (e.g., at least one hour, 1-16 hours, 2 hours, 4 hours, 8 hours, or 16 hours, etc.) to slow diffusion of the analgesic from the wound dressing during use, to ensure the desired release occurs for a period of several days, providing the desired sustained release of pain-relieving analgesic over a period of at least 4 days, or at least 5 days, such as from 4-7 days.

An ideal extended release analgesic wound dressing may provide one or more of a moist environment (e.g., prevents desiccation and cell death; aids epidermal migration, promotes connective tissue synthesis and supports autolytic debridement), exudate management (e.g., prevents maceration of wound and peri-wound skin; removes excess degradation enzymes which inhibit growth factors and matrix synthesis), non-traumatic removal (e.g., improves healing time by decreasing the pain and tissue damage associated with dressing changes; reduces the need for pain medications), microbial barrier (e.g., inhibits microbial invasion to prevent infection; infection impacts patient quality of life, prolongs inflammation, delays healing and can cause significant morbidity and death), mechanical protection (e.g., prevents further damage to dermal and epidermal appendages, which reduces the risk for peripheral sensitization and prolonged healing time), cost efficient (e.g., preventing expensive complications and dressing changes can result in significant savings, and treatment costs are more important than unit price when performing cost-benefit analysis), prolonged duration of release (e.g., extended delivery to provide lasting opioid-sparing analgesia without having to re-dose can improve both background and incident pain associated with rehab/wound care), and no systemic toxicity (e.g., drug release tuned to avoid high systemic drug levels which can have dangerous effects on the CNS and heart).

Non-traumatic removal may be provided by the present wound dressing. For example, the dressing can be designed to be applied once and left on the partial-thickness or other wound until re-epithelialization occurs. As the new epidermis forms, the dressing non-traumatically peels off. The dressing polymer matrix may be a synthetic, inert material that is lipophilic, biocompatible and bioresorbable. It may exhibit a sufficiently slow rate of polymer degradation to ensure that the dressing retains mechanical strength throughout wear time, and does not generate harmful byproducts (e.g., acidic monomer degradants). In an embodiment, pore size of the pores in the matrix may be no more than, or less than 50 microns (e.g., 1-50 μm) to minimize or prevent tissue ingrowth within the film, facilitating easy and painless removal, after the healing time has passed. The small pore size may also aid in minimizing or prevent external microorganisms from penetrating into the wound site. The material may pass ISO 10993 biocompatibility standards over the intended duration of use (e.g., 14 days).

As to mechanical protection, the dressing may have appropriate flexibility and conformability to ensure adherence to body surfaces. By way of example, the dressing and matrix may have an elastic modulus of from 400-1000 N/mm2 and/or an elongation at break of 100-200%.

As noted herein, the dressing may be provided as a single layer configuration, using readily available polymer(s) and generic, readily available analgesic(s). In addition, it may provide long shelf life (e.g., 12 months or more) without the need for refrigeration or other special storage requirements. The dressing may advantageously provide controlled drug release to prevent plasma drug levels from reaching toxic thresholds (e.g., plasma levels well below toxic threshold of 5 μg/mL). Dressings may be provided in various sizes, e.g., 4×4 cm, 10×10 cm, 20×10 cm, or the like.

II. Examples and Data

Figure 4:
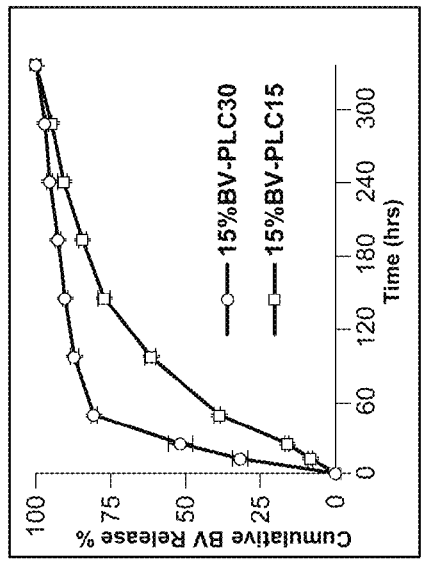
FIG. 4 shows cumulative bupivacaine release as a function of time, for different porous biosynthetic polymer films having different PLA/PCL monomer ratios.

Applicant has successfully manufactured microporous, bupivacaine (BV)-loaded PLC matrix films as shown in FIGS. 2A and 2B. In addition, Applicant has demonstrated that drug release kinetics can be tailored by adjusting parameters of the polymer matrix (FIGS. 3, 4, and 5). Scanning electron microscopy (SEM) was used to confirm microporous structures were achieved, as shown in FIG. 2B. Applicant performed in vitro release studies on various prototypes to determine the impact different formulation parameters have on drug release.

(1) Porosity: Applicant compared bupivacaine release from nonporous films to that of porous films (FIG. 3). Applicant determined that porosity had only a slight effect on the release profile and minimal effect on duration for bulk eroding polymers such as PLC.

(2) Polymer monomer fraction (lactide:caprolactone): Applicant evaluated bupivacaine release from microporous PLC films with different lactide:caprolactone monomer fractions to determine the effect monomer fraction has on drug release. Applicant compared bupivacaine release profiles from porous PLC films with either 70% (PLC30) and 85% (PLC15) lactide monomer ratio and found that increasing lactide content resulted in slower release (FIG. 4). In other words, higher lactide:caprolactone ratios result in a slower, more prolonged release. Applicant hypothesizes this is due to increased polymer chain packing and crystallinity when the lactide proportion is increased.

(3) Drug Loading: Applicant created microporous PLC films with drug-loading as high as 40% w/w and as low as 1% w/w and determined the effect drug loading concentration has on drug release kinetics (FIG. 5). Increased drug loading is correlated to increased drug release rates and shorter release durations. Based on preliminary results, the films made with PLC15 and 10-15% w/w drug loading produced good release profiles with a controlled burst within the first 72 hours followed by sustained taper release over days 4-7 (FIG. 4). As shown in FIG. 5, a greater burst effect is provided with higher drug loading, although the effect at values greater than 20% loading are not significantly greater (e.g., 40% loading does not provide any better burst than 20% loading). Further testing may be conducted as described below.

Wound Dressing Film Fabrication: PLC15 is dissolved into dichloromethane (DCM) and the predetermined amount of bupivacaine freebase (e.g. 10% w/w bupivacaine/PLC15)

is mixed in to create a bupivacaine-PLC solution. Next, a known amount of insoluble size-controlled NaCl salt particles are stirred into the PLC15-bupivacaine solution. The resulting suspension is then poured into a glass mold and the DCM is allowed to evaporate out, leaving a solid PLC15 film embedded with bupivacaine and NaCl particles. A final salt-leaching step is performed by submerging the films in deionized (DI) water for 24 hours with gentle agitation. Only 10% of the initial drug load is lost on the salt-leaching step.

Experimental Design: Films made via the aforementioned fabrication protocol are prepared with either 0%, 40%, 50%, 60%, 70%, or 80% w/w NaCl salt crystal particles to create films with increasing levels of porosity. NaCl crystal particle size is controlled at 50-100 μm and drug loading is kept at 10% w/w for testing. 0% w/w NaCl films serve as non-porous controls. N=4 films per group per timepoint are used for each assay. The following characterization assays are performed on films from each group.

Porosity: Porosity is evaluated using a liquid displacement method. Wound dressing film dimensions are measured using Vernier calipers to calculate film volume (V). Film dry weight (Wd) is measured, then the films are immersed in absolute ethanol in a cylinder. The cylinder is placed into an ultrasonic bath at 30° C. for 15 min to ensure pore penetration. Once removed, film surfaces are wiped with filter paper and then reweighed (Ws). Porosity equation:

$$\text{Porosity} = (W_s - W_d)/(\rho \cdot V) \times 100\%$$

Moisture Permeability: Moisture permeability of the films is determined by measuring the water vapor transmission rate (WVTR) according to the American Society for Testing and Materials (ASTM) standard E96. Films are cut into discs with 2.94-inch diameters. After 0, 7 and 14 days of simulated use in PBS at 37° C., films are secured onto EZ-Cup Vapometer aluminum cups (Thwing-Albert, West Berlin, NJ) containing pre-warmed deionized water. The cups utilize two neoprene gaskets with a Teflon seal to ensure films are sealed and vapor can only pass through the exposed dressing surface. The cups are placed in an oven set to 37° C. and a relative humidity of 50% maintained with dried silica gel. Cup weights are taken every hour for 12 hours. Evaporated water vs time is plotted and the slope of the curve is used to calculate the WVTR using the equation:

$$WVTR = \frac{\text{slope} \times 24}{\text{area}} \left[\frac{g}{m^2 \cdot day}\right]$$

Pore Morphology: Scanning electron microscopy (SEM) is used to observe the internal pore morphology of the films. Transverse and longitudinal sections of each film are prepared. Five images of different areas of the same film are image analyzed using ImageJ (NIH, Bethesda, MD, USA) and average pore diameter and pore distribution are compared between films of formulations. For each image, 50 pores are used for determination of average pore size.

Tensile Mechanical Properties: Film tensile mechanical properties are measured at room temperature, under unidirectional tension at a rate of 10 mm/min, using an Instron (Instron, Norwood, MA, USA) mechanical testing machine. Films are cut into dog bone shape samples (neck length 3 cm, width 1 cm). Tensile strength, maximal strain, % elongation at break, and the Young's modulus are determined from the stress-strain curve generated for each sample. Four samples for each formulation are tested after 0, 7 and 14 days of immersion in PBS at 37° C. to simulate clinical use.

Degradation Rate: Degradation rate of films are evaluated using a weight loss study over 21 days. 16 vacuum-dried films per formulation are weighed and then placed in individual conical tubes with 10 ml of PBS. Tubes are gently shaken in an incubator set at 37° C. PBS aew replaced every 72 hours and samples are taken for later evaluation of bupivacaine content using UV-visible spectroscopy. On day 7, 14 and 21, 4 films from each formulation are removed, vacuum dried and weighed. Weight loss is calculated using the equation: Weight Loss (%)=[(Wi−Wt)/Wi]×100%, where Wi is the initial film weight and Wt is the film weight after either 7, 14 or 21 days in PBS. In addition to each formulation, 0% no-drug controls are used to determine the effect bupivacaine has on degradation.

Bupivacaine Rate of Release Testing: Bupivacaine release kinetics are assessed by placing 1 cm² films into tubes filled with 30 ml of phosphate buffer solution (PBS). The tubes are kept in a 37° C. incubator and on a rotational stir plate set to 1 hz. Samples are collected at predetermined timepoints: 1, 2, 4, 6, 8, 10, 12, and 14 days. A GENESYS™ 150 (Thermo Fisher Scientific, MA, USA) UV-Vis spectrophotometer is used to determine bupivacaine concentration in the samples analyzed at 272 nm wavelength.

Porosity provides the desired WVTR within the range 1790 to 2266 g/m²·24 h. The drug release kinetics are within a desired range described by a controlled burst within the first 72 hours followed by sustained taper release over days 4-7. PLC in vivo degradation is greater than 6 months, therefore, minimal polymer weight loss and loss of mechanical properties of less than 10% will be achieved within the contemplated usage of 14 days.

If WVTR is not within the desired range, a lower or higher concentration of NaCl or other salt is used to either decrease or increase porosity, and therefore WVTR. If the formulation parameters required to produce the desired WVTR negatively affect the drug release profile (e.g., accelerating it), the polymer material may be adjusted to use a higher lactide/caprolactone monomer ratio (e.g. 90% lactide/10% caprolactone) to compensate for such.

Cytotoxicity Testing: Liquid extracts of exemplary wound dressing films are prepared by storing films in cell culture media at a concentration of 3 cm²/ml for 72 hours at 37° C. under gentle agitation. Primary human dermal fibroblast cell cultures (ATCC® PCS201012™) are used for cytotoxicity testing. After passage 2, cell cultures are seeded on 96-well plates at 1×10⁴ cells/100 μl/well and incubated for 24 hours. Then, the cells are cultured for 24 hours in the test liquid extract, after which the MTT assay is performed following standard protocols. The plate is read at 570 nm using a plate reader spectro-photometer. No-drug film extracts are used as a control. There are n=3 replicates per group. Cell viability is determined by the following equation: Cell Viability %=(100·ODe)/ODb, where ODe is the mean measured optical density of the 100% extracts of test samples, and ODb is the mean optical density of blanks. The lower the cell viability % value, the higher the cytotoxic potential of the test item is and if viability is reduced to <70% of the blank, the material is deemed to have a cytotoxic potential. It is expected to observe no in vitro cytotoxic effects caused by the wound dressing liquid extracts. PLC15 is a biocompatible, slow degrading polymer which should not release significant byproducts within the testing paradigm. One potential pitfall of the cytotoxicity testing protocol is that the liquid extract solution may become supra-saturated with bupivacaine due to small sink conditions, inducing a false drug cytotoxicity. In the body there would be near-infinite sink conditions, preventing supra saturated bupivacaine concentrations to develop. ISO 10993 states for dilution series along with original extract can be used to test cytotoxicity. In the case of observation that the original extract is cytotoxic, UV-Vis is used to determine the bupivacaine concentration of the extracts. If they are found to be above the 0.5% w/w cytotoxic threshold, the dilution series can be performed to mitigate the toxicity effect.

Although principally described in the context of use with partial thickness dermal injuries, it will be appreciated that the present embodiments may prove useful in a wide variety of dermal injuries, whether requiring use of prescription analgesics (such as bupivacaine), or a non-prescription analgesic, which may be used to treat more minor dermal injuries, or situations. For example, the dressings could be used in a wide variety of situations, such as tattoo aftercare (or tattoo removal aftercare), first aid, or for use after other dermatologic procedures, where pain management may be beneficial. Finally, although described in the context of delivery of analgesics, it will be apparent that the present wound dressings could alternatively or additionally be configured to deliver other drugs, for other purposes, over a similarly extended period of time.

In addition, unless otherwise indicated, numbers expressing quantities, constituents, distances, or other measurements used in the specification and claims are to be understood as optionally being modified by the term "about" or its synonyms. When the terms "about," "approximately," "substantially," or the like are used in conjunction with a stated amount, value, or condition, it may be taken to mean an amount, value or condition that deviates by less than 20%, less than 10%, less than 5%, less than 1%, less than 0.1%, or less than 0.01% of the stated amount, value, or condition.

Any reference to ASTM or other standards is to the latest version of such standard, unless otherwise indicated. Such standards are herein incorporated by reference in their entirety.

Disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure. Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

Accordingly, the present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. While certain embodiments and details have been included herein and in the attached disclosure for purposes of illustrating embodiments of the present disclosure, it will be apparent to those skilled in the art that various changes in the methods, products, devices, and apparatus disclosed herein may be made without departing from the scope of the disclosure or of the invention, which is defined in the appended claims. All changes which come within the meaning and range of equivalency of the claims are to be embraced within their scope.

The invention claimed is:

1. An analgesic-releasing wound dressing comprising:
a porous biosynthetic polymer film; and
a local analgesic impregnated within the porous biosynthetic polymer film;
wherein the wound dressing provides sustained release of the local analgesic over a period of at least 1 day, with a burst phase where at least 60% of total analgesic is released within 1-3 days;
wherein the local analgesic is loaded into the porous biosynthetic polymer film in an amount from 5% to 20% relative to the porous biosynthetic polymer film,
wherein the analgesic-releasing wound dressing is a single, substantially homogenous layer, without any additional complex construction, and
wherein 70-90% of a volume of the wound dressing comprises pores.

2. The wound dressing of claim 1, wherein the porous biosynthetic polymer film comprises at least one of a poly(lactide-co-caprolactone) copolymer, PLA, PLGA or PCL.

3. The wound dressing of claim 1, wherein the local analgesic comprises a small molecule analgesic having a molecular weight of less than 500 Daltons that is hydrophobic.

4. The wound dressing of claim 3, wherein the hydrophobic local analgesic has a partition coefficient (log P) value of at least 2.0.

5. The wound dressing of claim 1, wherein the local analgesic comprises an amide local analgesic selected from one or more of bupivacaine, levobupivacaine, lidocaine, prilocaine, or ropivacaine.

6. The wound dressing of claim 1, wherein the wound dressing provides sustained release of the local analgesic over a period of at least 2 days, or over a period of from 1 to 3 days, 3 to 5 days, 3 to 7 days, or 4 to 7 days.

7. The wound dressing of claim 1, wherein the porous biosynthetic polymer film has a lactide/caprolactone molar ratio from 2:1 to 10:1.

8. The wound dressing of claim 1, wherein the porous biosynthetic polymer film has a water vapor transmission rate from 1000 $g/m^2 \cdot day$ to 3000 $g/m^2 \cdot day$.

9. The wound dressing of claim 1, wherein the local analgesic is loaded into the porous biosynthetic polymer film in an amount from 10% to 15% by weight.

10. The wound dressing of claim 1, wherein the wound dressing is consists of a single layer, being substantially homogenous throughout a thickness thereof.

11. The wound dressing of claim 1, wherein the wound dressing has a thickness of at least 200 μm, up to 2 mm, or up to 1 mm.

12. The wound dressing of claim 1, wherein the porous biosynthetic polymer film further comprises hyaluronic acid, and/or the wound dressing further comprises an antimicrobial agent incorporated into the wound dressing.

13. The analgesic-releasing wound dressing as recited in claim 1, wherein the wound dressing consists of a single layer, and wherein:
the porous biosynthetic polymer film comprises a poly(lactide-co-caprolactone) copolymer, having a lactide/caprolactone molar ratio from 2:1 to 9:1, and having a water vapor transmission rate from 1000 $g/m^2 \cdot day$ to 3000 $g/m^2 \cdot day$, wherein the biosynthetic polymer film is resorbable or dissolvable when positioned for use over a partial thickness dermal injury of a patient, so as to remain in place, providing wound protection for at least 10 days, but debriding or falling off naturally within 20 days when positioned over a partial thickness dermal injury of a patient; and the local analgesic impregnated within the porous biosynthetic polymer film comprises an amide analgesic having a partition coefficient (log P) value from 3.0 to 3.8, the analgesic being impregnated within the porous biosynthetic polymer film at a weight fraction of from 5-20% relative to the porous biosynthetic polymer film, wherein the wound dressing provides sustained release of the analgesic over a period of at least 1 day and at least 60% of the total analgesic is released within 1-3 days.

14. The wound dressing of claim 1, wherein the porous biosynthetic polymer film has a pore size of no more than 50 microns.

15. The wound dressing of claim 1, wherein the wound dressing has an elastic modulus of from 400-1000 N/mm$^2$ and an elongation at break of from 100%-200%.

16. A method of treating pain associated with a partial thickness dermal injury, the method comprising:
providing a wound dressing, wherein the wound dressing consists of a single, substantially homogenous layer the wound dressing including:
a porous biosynthetic polymer film comprising a poly (lactide-co-caprolactone) copolymer; and
a local analgesic impregnated within the porous biosynthetic polymer film, wherein the wound dressing provides sustained release of the local analgesic while reducing pain over a sustained period of time of at least 1 day;
wherein the wound dressing remains in place over the partial thickness dermal injury for a full duration of healing thereof, without removal of the wound dressing for any wound dressing changes, said full duration of healing being about 14 days, wherein the wound dressing releases a burst of at least 60% of the local analgesic over days 1-3 after application over the partial thickness dermal injury, followed by a sustained tapered release from days 4-7 after application, wherein 70-90% of a volume of the wound dressing comprises pores, wherein the wound dressing falls off naturally within 20 days, and wherein polymer weight loss and loss of mechanical properties of the wound dressing is less than 10% within the full duration of healing.

17. The method of claim 16, wherein the local analgesic comprises an amide local analgesic comprising at least one of bupivacaine, levobupivacaine, lidocaine, prilocaine, or ropivacaine.

18. The method of claim 16, wherein the biosynthetic polymer film is resorbable or dissolvable when positioned for use over the partial thickness dermal injury of a patient, so as to remain in place, providing wound protection for about 14 days, but debriding or falling off naturally within 20 days when positioned over the partial thickness dermal injury of a patient.

19. An analgesic-releasing wound dressing comprising:
a porous biosynthetic polymer film; and
a local analgesic impregnated within the porous biosynthetic polymer film;
wherein:
the wound dressing provides sustained release of the local analgesic over a period of at least 1 day, with a burst phase where at least 60% of total analgesic is released within 1-3 days,
the local analgesic is loaded into the porous biosynthetic polymer film in an amount from 5% to 20% relative to the porous biosynthetic polymer film,
the analgesic-releasing wound dressing consists of a single, substantially homogenous layer,
the wound dressing has a thickness of at least 200 µm, and up to 2 mm,
70-90% of a volume of the wound dressing comprises pores,
the wound dressing provides protection for at least 10 days, but debriding or falling off naturally within 20 days when positioned over a partial thickness dermal injury of a patient, and
polymer weight loss and loss of mechanical properties of the wound dressing is less than 10% within a full duration of healing.

* * * * *